US009335981B2

(12) United States Patent
Chakradhar et al.

(10) Patent No.: US 9,335,981 B2
(45) Date of Patent: May 10, 2016

(54) SOURCE-TO-SOURCE TRANSFORMATIONS FOR GRAPH PROCESSING ON MANY-CORE PLATFORMS

(71) Applicant: NEC Laboratories America, Inc., Princeton, NJ (US)

(72) Inventors: Srimat Chakradhar, Manalapan, NJ (US); Michela Becchi, Columbia, MO (US); Da Li, Columbia, MO (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/510,660

(22) Filed: Oct. 9, 2014

(65) Prior Publication Data

US 2015/0113514 A1    Apr. 23, 2015

Related U.S. Application Data

(60) Provisional application No. 61/929,521, filed on Jan. 21, 2014, provisional application No. 61/892,497, filed on Oct. 18, 2013.

(51) Int. Cl.
*G06F 9/45* (2006.01)

(52) U.S. Cl.
CPC . *G06F 8/456* (2013.01); *G06F 8/51* (2013.01)

(58) Field of Classification Search
CPC ................................... G06F 8/51; G06F 8/456
USPC ........................................................ 717/149
See application file for complete search history.

(56) References Cited

U.S. PATENT DOCUMENTS

| 2010/0153956 | A1* | 6/2010 | Capps, Jr. | G06F 9/30 718/102 |
| 2010/0306752 | A1* | 12/2010 | Bordelon | G06F 8/4452 717/149 |
| 2014/0019949 | A1* | 1/2014 | Craymer | G06F 8/452 717/150 |
| 2014/0047421 | A1* | 2/2014 | Shimizu | G06F 17/12 717/149 |
| 2014/0092087 | A1* | 4/2014 | Kazama | G06F 9/505 345/420 |
| 2014/0282572 | A1* | 9/2014 | Kang | G06F 9/4881 718/103 |

* cited by examiner

*Primary Examiner* — John Chavis
(74) *Attorney, Agent, or Firm* — Joseph Kolodka

(57) ABSTRACT

Methods are provided for source-to-source transformations for graph processing on many-core platforms. A method includes receiving a graph application including one graph, expressed by a graph application programming interface configured for defining and manipulating graphs. The method further includes transforming, by a source-to-source compiler, the graph application into a plurality of parallel code variants. Each of the plurality of parallel code variants is specifically configured for parallel execution by a target one of a plurality of different many-core processors. The method also includes selecting and tuning, by a runtime component, a particular one of the parallel code variants for the parallel execution responsive to graph application characteristics, graph data, and an underlying code execution platform of the plurality of different many-core processors.

17 Claims, 2 Drawing Sheets

SOURCE-TO-SOURCE TRANSFORMATIONS FOR GRAPH PROCESSING ON MANY-CORE PLATFORMS

RELATED APPLICATION INFORMATION

This application claims priority to provisional application Ser. No. 61/892,497 filed on Oct. 18, 2013 and to provisional application Ser. No. 61/929,521 filed on Jan. 21, 2014, incorporated herein by reference.

BACKGROUND

1. Technical Field

The present invention relates to data processing, and more particularly to source-to-source transformations for graph processing on many-core platforms.

2. Description of the Related Art

Many applications use graphs to represent and analyze data, but the effective deployment of graph algorithms on many-core processors is still a challenge task. Although there are good compilation and runtime frameworks for parallelizing graph applications on multi-core CPUs, such frameworks do not exist for many-core devices. There is a need for efficient source-to-source compilers that automatically compile and parallelize graph applications on many-core processors because (a) many-core devices offer higher peak performance than multi-core devices, and (b) many-core programming is still a highly specialized (and error prone) skill.

SUMMARY

These and other drawbacks and disadvantages of the prior art are addressed by the present principles, which are directed to source-to-source transformations for graph processing on many-core platforms.

According to an aspect of the present principles, a method is provided. The method includes receiving a graph application including one graph, expressed by a graph application programming interface configured for defining and manipulating graphs. The method further includes transforming, by a source-to-source compiler, the graph application into a plurality of parallel code variants. Each of the plurality of parallel code variants is specifically configured for parallel execution by a target one of a plurality of different many-core processors. The method also includes selecting and tuning, by a runtime component, a particular one of the parallel code variants for the parallel execution responsive to graph application characteristics, graph data, and an underlying code execution platform of the plurality of different many-core processors.

According to another aspect of the present principles, a method is provided. The method includes performing, using a compiling processor, source-to-source compiling on a graph application that includes at least one graph. The source-to-source compiling step includes transforming the graph application and related container data structures into platform-specific container data structures, using parallel code transformation responsive to parallel iterators, and using parallel blocks of code for primitives. The source-to-source compiling step further includes managing execution synchronizations for the graph, the platform-specific container data structures, and the iterators. The source-to-source compiling step also includes converting platform-independent synchronization primitives into platform-specific synchronization primitives.

According to yet another aspect of the present principles, a method is provided. The method includes configuring a graph-processing run-time library with a selection processor configured to select a particular parallel code variant, from among a plurality of received parallel code variants of a graph application including at least one graph, for parallel execution by a target many-core coprocessor responsive to graph application characteristics, graph data, and an underlying code execution platform of the target many-core processor. The method further includes configuring the run-time library with dynamic memory allocation management for an execution of the particular parallel code variant the graph application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to source-to-source transformations for graph processing on many-core platforms. Advantageously, the present principles are suitable for use with graph applications. However, it is to be appreciated that the present principles can be used with other types of applications, while maintaining the spirit of the present principles.

The present principles provide a new source-to-source compiler that automatically generates parallel code for different many-core platforms (e.g., including, but not limited to, GPUs and the Intel Xeon Phi®) starting from a single, platform-agnostic graph programming Application Programming Interface (API).

The present principles advantageously automate the development of high-performance graph applications on many-core platforms using the source-to-source compiler of the present principles.

Figure 1:
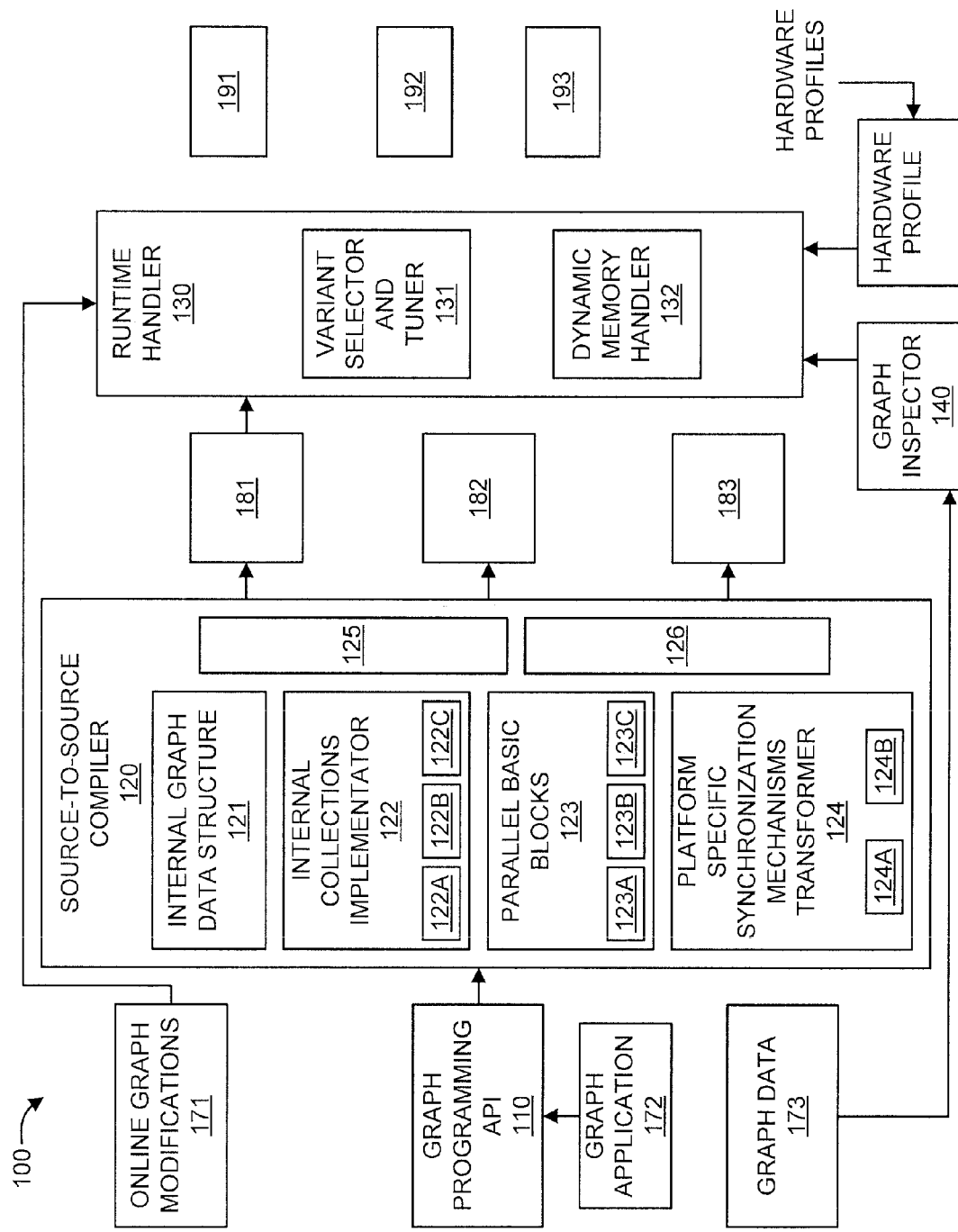
FIG. 1 shows an exemplary graph processing system 100, in accordance with an embodiment of the present principles.

FIG. 1 shows an exemplary graph processing system 100, in accordance with an embodiment of the present principles. The system 100 includes a graph programming Application Programming Interface (API) 110, a source-to-source compiler 120, a runtime library 130, a graph inspector 140, and a hardware profiler 150.

In an embodiment, the source-to-source compiler 120 is processor-based. Of course, other elements of FIG. 2 can be processor-based, while maintaining the spirit of the present principles.

The source-to-source compiler 120 includes an internal graph data structure transformer 121, an internal collections implementator 122, a set of parallel basic blocks 123, a set of platform-specific synchronization mechanisms transformer 124, a Compute Unified Device Architecture (CUDA) code writer 125, and an OpenMP code writer 126.

The internal collections implementator 122 includes containers. The containers include, for example, a set container 122A, a 31 multi-set container 122B, and a queue container 122C. Of course, other containers can also be used.

The set of parallel basic blocks 123 include primitives. The primitives include a BFS iterator 123A, a reduction primitive 123B, and a scan primitive 123C.

The platform-specific synchronization mechanisms transformer 124 includes a global/local barrier 124A and a flat/hierarchical atomizer 125.

Online graph modifications 171 are provided to the runtime library 130.

A graph application 172 is provided to the graph programming API 110.

Graph data 173 is provided to the graph inspector 140.

The source-to-source compiler 120 outputs variants$_{CPU}$ 181, variants$_{phi}$ 182, and variants$_{GPU}$ 183 corresponding to the system being used with a multi-core CPU 191, an INTEL XEON PHI processor 192, and/or an NVIDIA Graphics Processing Unit (GPU) 193, respectively.

The runtime library 130 includes a variant selector and tuner 131 a dynamic memory handler 132.

In an embodiment, an application developer writes the graph application using a programming interface that includes a high-level graph programming API 110 and a set of platform-agnostic, sequential and parallel constructs that allow the user to define generic graph applications. The graph programming API 110 is implemented and executed by our new runtime library 130.

Then, the application developer uses the source-to-source compiler 120 to generate an efficient, highly parallelized implementation of the graph application, which can run on different many-core processors like the Intel Xeon Phi® or a GPU.

The source-to-source compiler 120 generates different code variants for multi-core CPUs, Intel Xeon Phi® coprocessors and NVIDIA® GPUs. These code variants may differ in several aspects, including, for example: from the type of parallelization performed, to the implementation of the underlying data structures, to the handling of nested parallelism, and more. The generated code is written in OpenMP and CUDA and, in an embodiment, it uses the offload execution model on the Intel® Phi. During code generation, the graph and the containers (sets 122A, multi-sets 122B, and queues 122C) are transformed into internal, platform-specific data structures by the platform-specific synchronization mechanisms transformer 124. In addition, existing parallel basic blocks 123 are used for common primitives such as reduction 123A, sort 123B, and scan 123C. Parallelization is enabled by the presence of parallel iterators, which can be explicitly inserted in the code by the programmer. The source-to-source compiler 120 automatically handles synchronizations associated with the graph, the iterators and the containers. Synchronizations associated with custom data structures can be explicitly indicated by the programmer using high-level, platform-independent synchronization primitives, which are transformed into platform-specific synchronization mechanisms by the platform-specific synchronization mechanisms transformer 124.

Finally, the runtime system supports two important functions: (i) selecting, by the variant selector and tuner 130A, the most suitable code variant depending on the characteristics of the application, the dataset and the underlying platform, and (ii) supporting, by the dynamic memory handler 130B, dynamic memory allocation through the offset address.

In an embodiment, the variant selector and tuner 130A includes a selection processor for implementing the selection and tuning. In an embodiment, the selection processor can also be used to execute a selected code variant for a graph application including at least one graph. Tuning can be performed on a selected code variant to avoid execution errors and to optimize parallel execution of at least portions of the selected code variant.

Figure 2:
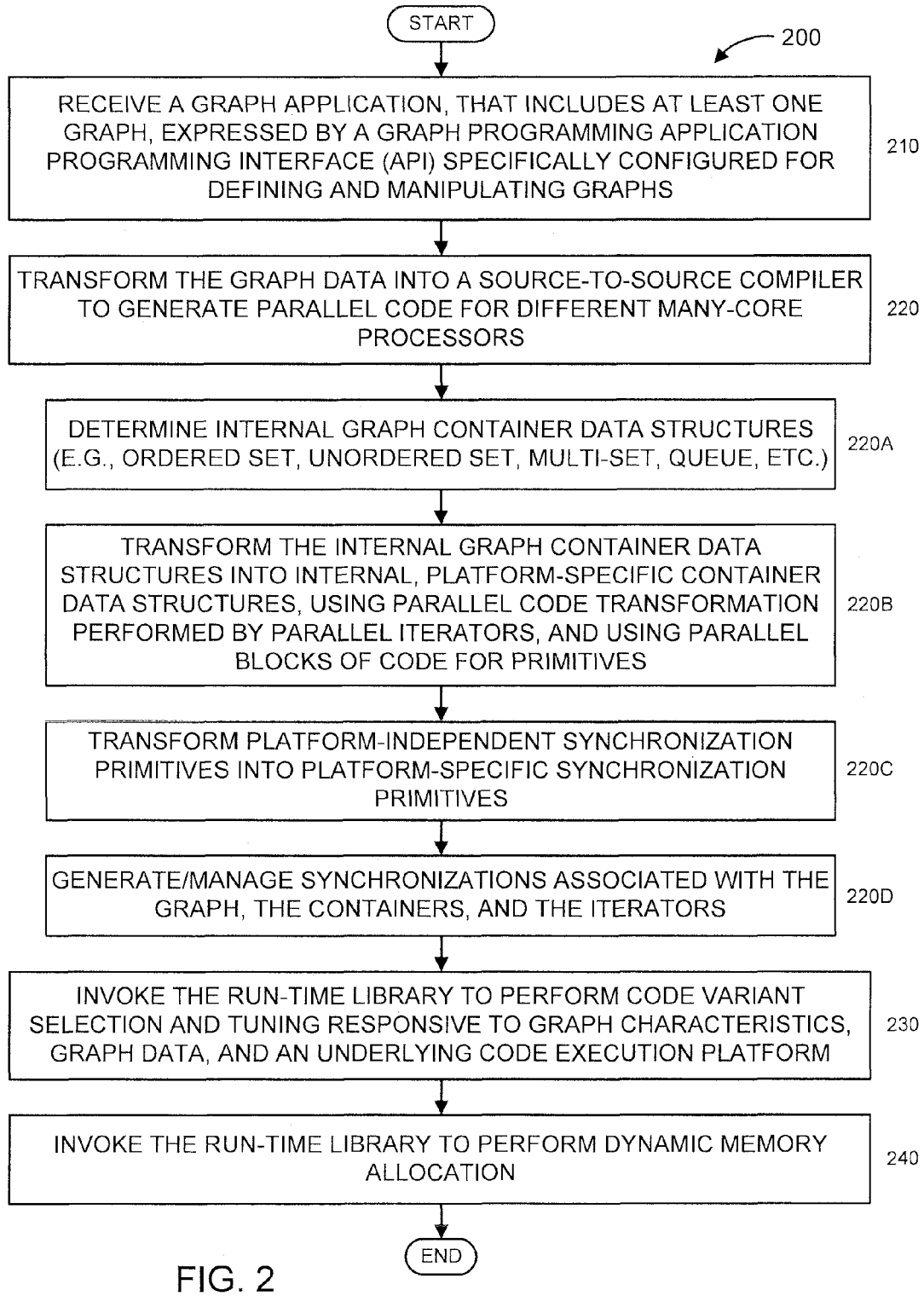
FIG. 2 shows an exemplary method 200 for generating and executing source-to-source transformations for many-core processors, in accordance with an embodiment of the present principles.

FIG. 2 shows an exemplary method 200 for generating and executing source-to-source transformations for many-core processors, in accordance with an embodiment of the present principles. Steps 210 and 220 correspond to a code generation time, and steps 230 and 240 corresponds to runtime. It is to be appreciated that while the following steps are labeled sequentially, such labeling is not intended to imply any specific ordering, as some steps can be performed out of order as well as in parallel. These and other variations to method 200 are readily determined by one of ordinary skill in the art given the teachings of the present principles provided herein, while maintaining the spirit of the present principles.

At step 210, receive a graph application, that includes at least one graph, expressed by a graph programming application programming interface (API) specifically configured for defining and manipulating graphs. The expression of the graph application can include node information, edge information, root information, weight information, and so forth. The expression of the graph application received at step 210 can further include, for example, but is not limited to, primitives. The primitives can include, but are not limited to, dynamic memory management primitives, parallel primitives, synchronization primitives, and runtime primitives.

Further regarding step 210, as well as API 110, the API includes methods to define and manipulate application specific attributes, container data structures, parallel code iterators, dynamic memory management primitives, parallel primitives, synchronization primitives, and runtime primitives.

At step 220, transform the graph data into a source-to-source compiler to generate parallel code for different many-core processors.

Step 220 can include, for example, steps 220A through 220D\4.

At step 220A, determine internal graph container data structures (e.g., ordered set, unordered set, multi-set, queue, etc.). These internal graph container data structures are typically platform-independent.

At step 2220B transform the internal graph container data structures into internal, platform-specific container data structures (by the platform-specific synchronization mechanisms transformer 124), using parallel code transformation performed by parallel iterators, and using parallel blocks of code for primitives.

At step 220C, transform platform-independent synchronization primitives into platform-specific synchronization primitives (by the platform-specific synchronization mechanisms transformer 124).

At step 220D, generate/manage synchronizations associated with the graph, the containers, and the iterators.

At step 230, invoke the run-time library to perform code variant selection and tuning responsive to graph characteristics, graph data, and an underlying code execution platform.

At step 240, invoke the run-time library to perform dynamic memory allocation.

An exemplary graph programming API that can be used for API 110 is as follows:

```
GRAPH API
graph/node/edge
Default attributes
  graph: nodes, edges, root, num_nodes, num_edges, directed
  node: (in_/out_)neighbors, (in_/out_)edges, (in/out)degree,
    level
  edge: left, right, weight; primitive: node mate(node)
Methods to define/manipulate application-specific attributes
  void addAttr(graph/node/edge, attr_name, type, default_value);
  void setAttr(attr_name, value);
  value getAttr(attr_name);
CONTAINER DATA STRUCTURES
  set: void add(item), void remove(item), bool include(item),
    bool empty( ), int size( ), void clear( ), bool equal(set)
  oset: primitives of set; item first( ), item next(item)
  multiset, omultiset: primitives of set/oset, int occurrences(item)
  queue: void push(item), item pop( ), item front( ), int size( ),
    bool empty( ), item next(item), void clear( )
ITERATORS
  sequential:
    while(condition [; dynamic_update(set)])
    for(datatype item:domain [; dynamic_update(set)])(filter)
  parallel:
    foreach(datatype item:domain [; clear domain])(filter)
    inBFS(var: domain from source_node)
DYNAMIC MEMORY MANAGEMENT PRIMITIVES
  newGraph
  addNode/deleteNode
  addEdge/addDirectEdge/deleteEdge
  new/delete
PARALLEL PRIMITIVES
  item reduction(container, operator)
  void scan(in_container, out_container, operator)
  void sort(in_container, out_container)
SYNCHRONIZATION PRIMITIVES
  barrier
  critical{ }
RUNTIME PRIMITIVES
  void commit(bool) - commits a set of changes to the graph and,
    if parameter is true, to the working set
  void rebalance( ) - rebalance an extended CSR representation
```

A description will now be given regarding some of the benefits/advantages of the present principles over the prior art.

The graph programming API 210 has many primitives that specifically help in automatically generating parallelized code for a variety of different many-core platforms.

The source to source compiler 120 has many new transformations to generate efficient parallelized code by recognizing parallelizing opportunities exposed by the use of the graph programming API 210 by the application developer to write the graph application.

The design of the run-time library 130 is specific to each many-core platform, and one key strength of the run-time library 130 is that it can dynamically select and tune the code variant that better fits the characteristics of the target dataset and the hardware profile, as well as enable dynamic memory allocation.

A description will now be given of some of the many attendant competitive/competitive values of the present principles.

The present principles offer at least the following two values: (a) our source-to-source compiler generates parallelized code for graph applications so that they execute as fast as manually optimized code for many-core processors, and (b) the time required to develop good parallel versions of the code that can execute on many-core processors is reduced by 10× to 100×, and our procedure is completely automatic.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
receiving a graph application including one graph, expressed by a graph application programming interface configured for defining and manipulating graphs;
transforming, by a source-to-source compiler, the graph application and related container data structures into a platform-specific container data structures including a plurality of parallel code variants, each of the plurality of parallel code variants being specifically configured for parallel execution by a target one of a plurality of different many-core processors, wherein different parallel code variants are generated for each of the different many-core processors;
managing execution synchronizations for the graph and the platform-specific container data structures, the managing including converting platform-independent synchronization primitives into platform-specific synchronization primitives; and selecting and tuning, by a runtime component, a particular one of the parallel code variants for the parallel execution responsive to graph application characteristics, graph data, and an underlying code execution platform of the plurality of different many-core processors.

2. The method of claim 1, further comprising selecting the target one of the plurality of different many-core processors as a best match to computational needs of the graph application from among the plurality of many-core processors.

3. The method of claim 1, wherein the runtime component is a runtime library.

4. The method of claim 3, wherein the run-time component performs dynamic memory allocation.

5. The method of claim 3, wherein the run-time library selects and tunes the particular one of the parallel code variants for execution responsive to one or more hardware profiles relating to the underlying code execution platform.

6. The method of claim 1, wherein the application programming interface includes methods to define and manipulate application specific attributes, container data structures, parallel code iterators, dynamic memory management primitives, parallel primitives, synchronization primitives, and runtime primitives.

7. The method of claim 6, wherein the parallel primitives comprise a reduction primitive, a scan primitive, and a sort primitive.

8. The method of claim 6, wherein the synchronization primitives comprise a barrier primitive and a critical primitive.

9. The method of claim 6, wherein the runtime primitives comprise a commit primitive and a rebalance primitive.

10. The method of claim 1, wherein the runtime component dynamically manages, using a dynamic memory management technique, runtime graph-topology modifications for the graph application.

11. The method of claim 1, wherein the graph application programming interface is platform-independent, and includes a set of platform independent sequential and parallel constructs.

12. The method of claim 1, further comprising dynamically managing, by a runtime dynamic memory manager with one or more runtime dynamic memory management techniques, runtime graph-topology modifications for the graph application.

13. A method, comprising:

performing, using a compiling processor, source-to-source compiling on a graph application that includes at least one graph, wherein said source-to-source compiling step includes:

transforming the graph application and related container data structures into platform-specific container data structures, using parallel code transformation responsive to parallel iterators, and using parallel blocks of code for primitives, and managing execution synchronizations for the graph, the platform-specific container data structures, and the iterators; and converting platform-independent synchronization primitives into platform-specific synchronization primitives.

14. A non-transitory article of manufacture tangibly embodying a computer readable program which when executed causes a computer to perform the steps of claim 13.

15. A method comprising:

configuring a graph-processing run-time library with a selection processor configured to select a particular parallel code variant, from among a plurality of parallel code variants of a graph application including at least one graph, for parallel execution by a target many-core coprocessor responsive to graph application characteristics, graph data, and an underlying code execution platform of the target many-core processor, wherein the parallel code variants of the graph application are specifically configured for parallel execution by a target one of a plurality of different many-core processors, and wherein different parallel code variants are generated for each of the different many-core processors;

managing execution synchronizations for the graph application by converting platform-independent synchronization primitives into platform-specific synchronization primitives; and configuring the run-time library with dynamic memory allocation management for an execution of the particular parallel code variant responsive to graph application characteristics, graph data, and an underlying code execution platform of the plurality of different many-core processors.

16. The method of claim 15, wherein a dynamic memory manager in the runtime library dynamically manages runtime graph-topology modifications for the graph application, using one or more dynamic memory management techniques.

17. The method of claim 15, wherein the run-time library selects the particular parallel code variant for execution responsive to one or more hardware profiles relating to the underlying code execution platform.

* * * * *